Figure 1:
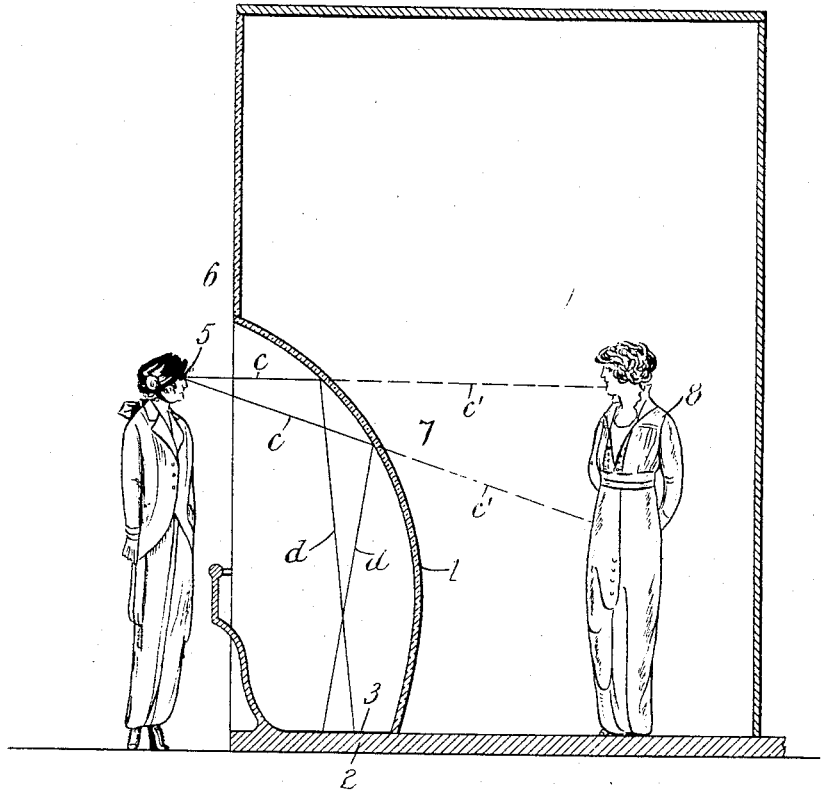

T. O. PETERSON.
DEVICE FOR VIEWING OBJECTS.
APPLICATION FILED APR. 10, 1913.

1,096,191.

Patented May 12, 1914.
2 SHEETS—SHEET 1.

Witnesses.
Franklin E. Low.
Leonard A. Powell.

Inventor.
Tron O. Peterson,
by his attorney

UNITED STATES PATENT OFFICE.

TRON O. PETERSON, OF NEW YORK, N. Y.

DEVICE FOR VIEWING OBJECTS.

1,096,191.  Specification of Letters Patent.  Patented May 12, 1914.

Application filed April 10, 1913. Serial No. 760,094.

*To all whom it may concern:*

Be it known that I, TRON O. PETERSON, a citizen of the United States, residing at New York, in the county of New York and State of New York, have invented new and useful Improvements in Devices for Viewing Objects, of which the following is a specification.

This invention relates to an improved device for viewing objects, the same being particularly adapted to be used for the windows of stores, show cases, car windows and, in fact, for any use in which a transparent partition is to be employed through which it is desired to observe articles or objects.

The object of the invention is to provide a device of the character set forth which is so constructed that the view of the observer through the glass or transparent partition forming a part thereof will not be interfered with by the reflection in said glass of objects on the same side as that upon which the observer is located. For example, it is very important that articles placed in a show window of a store should be clearly seen by observers upon the sidewalk, and it is a well known fact that in the ordinary window, consisting of a vertical plate of glass, a reflection is obtained from said plate of glass of objects in the street or upon the opposite side of the street which very much confuses the observer and interfers with the clear view of articles of merchandise placed in the chamber at the rear of said glass for purposes of exhibition. The same is true with relation to the front window of a car, the motorman often being confused by reflections of objects in the glass in front of him, so that he cannot clearly see objects on the other side of the glass or in front of the car. It is very important that such reflections should be removed from the glass or window in the case of a car, so that the motorman may have a clear and unobstructed view.

My improved device renders it practicable for an observer in front of a store window to obtain a perfectly clear view of articles placed in said window without the reflection of objects in the street or in buildings upon the opposite side of the street, so that the attention of the observer is not attracted from the articles in the window, while at the same time the articles in the window are protected by a glass or transparent partition.

The same is true with relation to the embodiment of my invention in a car window wherein the motorman is enabled to clearly see through the window without having articles or persons standing behind him in the car or on the platform reflected from the glass to his eye, thus obscuring or confusing his vision.

The device of this invention is an improvement upon the device set forth in the patent issued to me May 6, 1913, No. 1.060.787. but differs from that invention in the specific form of the transparent partition.

Figure 2:
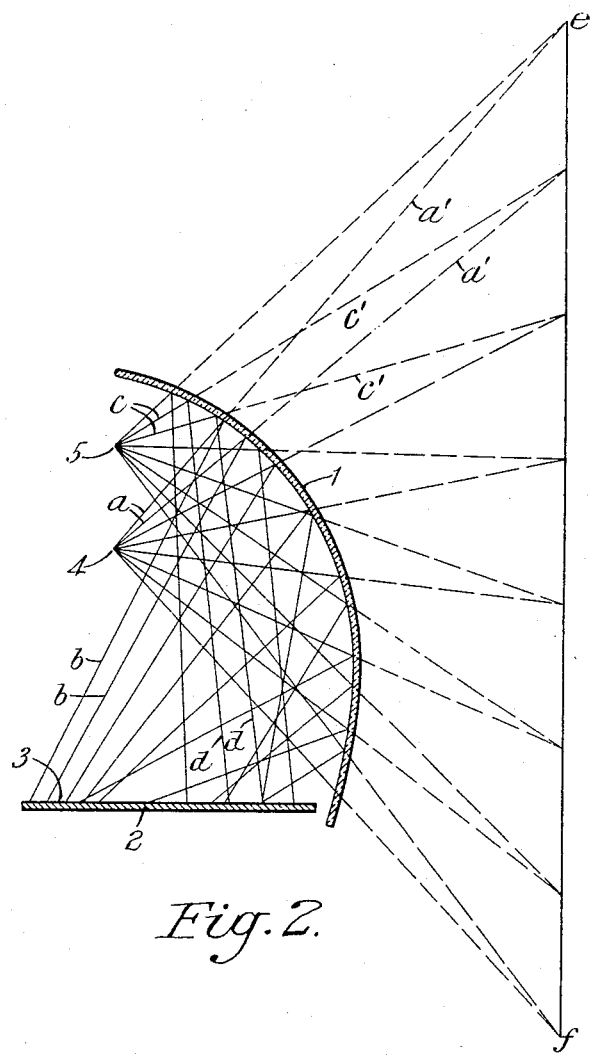

Referring to the drawings: Figure 1 is a vertical transverse section of a store window constructed in accordance with my invention with a figure of a person on the sidewalk in front of the window and with a figure of a model behind said window in the space or chamber reserved for the exhibition of articles of merchandise. Fig. 2 is a diagrammatic view showing in section a transparent plate and another plate having a non-reflecting surface adjacent thereto embodying my invention. Said Fig. 2 may be considered either as a plan or an elevation, as it is practicable to use the same in either position. Said Fig. 2 of the drawing illustrates the direction taken by rays of light when reflected from the transparent partition to the non-reflecting surface of the plate adjacent thereto constituting a shadow box.

In the drawings, 6 is a store window constructed in accordance with my invention comprising a curved plate 1 formed of transparent material, such as glass. Upon one side of said glass partition is a chamber 7 in which articles of merchandise, such as dress models 8 and the like, are exhibited.

2 is a plate or object adjacent to the curved plate 1 and having a non-reflecting surface 3 upon the side thereof adjacent to said plate 1. The face 3 is preferably covered with a dull black material in order that rays of light reflected from the plate 1 against said surface will not be reflected from said surface.

The plates 1 and 2 are arranged at such angles to each other that objects on the side upon which the observer is located, instead of being reflected by the glass plate 1 to the eye of an observer standing outside said window, are reflected upon the non-reflecting surface 3 of the plate 2. For example, the lines *a* indicate the lines of vision from the eye of the observer 4 to the glass plate 1 and the lines *b* indicate the direction in which a ray of light would be reflected which passed along the line *a* and impinged against the plate 1. Thus said ray of light would be reflected against the dead black upper face 3 of the opaque plate 2 and would not be returned by said partition to the eye of the observer to cause confusion and a reflection of objects outside the window. Therefore, the lines *a* would be continued, as indicated in dotted lines *a'* in said figure of the drawing to the object displayed upon the opposite side of the transparent partition. The plate 1 is, therefore, placed at such an angle to the plate 2 and is made upon such a curve that the reflection of objects outside the window, whether the eye of the observer be in the position indicated at 4, or at 5, or at any position therebetween, would be reflected against the dark opaque surface 3 of the plate 2 and thus would not be reflected back to the eye of the observer.

The lines *c* indicate the lines of vision from the eye of the observer at 5 to the plate 1. The lines *d* indicate the direction in which a ray of light would be reflected which passed along the lines *c* and impinged against the plate 1, it being seen that said rays of light would be reflected against the dead black face 3 of the plate 2 and would not be returned by said plate to the eye of the observer to cause confusion and a reflection of objects outside the window. The lines *c* would be continued, as indicated in dotted lines *c'*, to the object displayed upon the opposite side of the transparent plate from that upon which the observer is located.

It will be readily understood that the plates 1 and 2 may be arranged both as vertical plates, or the plate 1 may extend in a vertical direction while the plate 2 extends in a horizontal direction. The angles of the plates 1 and 2 to each other, together with the curve of the plate 1, are what determine the direction in which the rays of light are reflected onto the opaque surface 3, and so long as these rays of light are reflected onto said opaque surface, the reflection of objects from the plate 1 to the eye of the observer will be prevented and the device will perform the function for which it is intended.

The line *e—f* indicates the field to be viewed by the observer whose eye is located in the position of the eye 4. If it is desired to have a series of view points for the observer, the surface 3 must be extended to receive all of the rays reflected from the plate 1.

Having thus described my invention, what I claim and desire by Letters Patent to secure is:

1. A device for viewing objects having, in combination, a curved transparent plate and a plate having a non-reflecting surface adjacent thereto, said plates located at such positions relatively to each other that rays of light will be reflected from said transparent plate against said non-reflecting surface.

2. A device for viewing objects comprising in its construction a curved transparent plate and an opaque plate located adjacent to said transparent plate at an angle thereto.

3. A device for viewing objects comprising in its construction a curved transparent plate and an opaque plate, said opaque plate being located adjacent to the concave face of said transparent plate and at an angle thereto.

In testimony whereof I have hereunto set my hand in presence of two subscribing witnesses.

TRON O. PETERSON.

Witnesses:
F. H. DUNN,
JOHN F. MURPHY.